United States Patent [19]
Aravamudan et al.

[11] Patent Number: 6,154,749
[45] Date of Patent: *Nov. 28, 2000

[54] DISTRIBUTED CACHING SCHEME FOR DATABASE SYSTEMS

[75] Inventors: Murali Aravamudan, Freehold; Antonio DeSimone, Ocean; Hosagrahar Visvesvaraya Jagadish, Berkeley Heights, all of N.J.

[73] Assignee: AT&T Corp., New York, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 09/007,983

[22] Filed: Jan. 15, 1998

[51] Int. Cl.[7] ........................................................ G06F 17/30
[52] U.S. Cl. .................................. 707/104; 707/8; 707/10
[58] Field of Search .................................. 707/10, 104, 8, 707/103, 201, 105, 102, 2; 364/282, 283, 228, 229, 200; 711/168

[56] References Cited

U.S. PATENT DOCUMENTS

| | | | |
|---|---|---|---|
| 5,495,601 | 2/1996 | Narang et al. | 707/8 |
| 5,560,005 | 9/1996 | Hoover et al. | 707/10 |
| 5,630,125 | 5/1997 | Zellweger | 707/103 |
| 5,884,320 | 3/1999 | Agrawal et al. | 707/104 |

*Primary Examiner*—Wayne Amsbury
*Assistant Examiner*—Thu-Thao Havan
*Attorney, Agent, or Firm*—Kenyon & Kenyon

[57] ABSTRACT

A caching scheme for spatially distributed databases in which a central database maintains all information to be stored. A plurality of local databases include copies of the information stored in the central database. For each data record in the central database, there is at most one copy of the data record in the set of local databases.

The caching scheme includes a method for serving database requests in which a service request is made to a first local database located in the area from which the request originates. If the first local database fails to service the request, the central database services the request. After serving the request, a second local database that contains the data record is identified and the data record therein is destroyed. A new copy is written to the first local database.

22 Claims, 3 Drawing Sheets

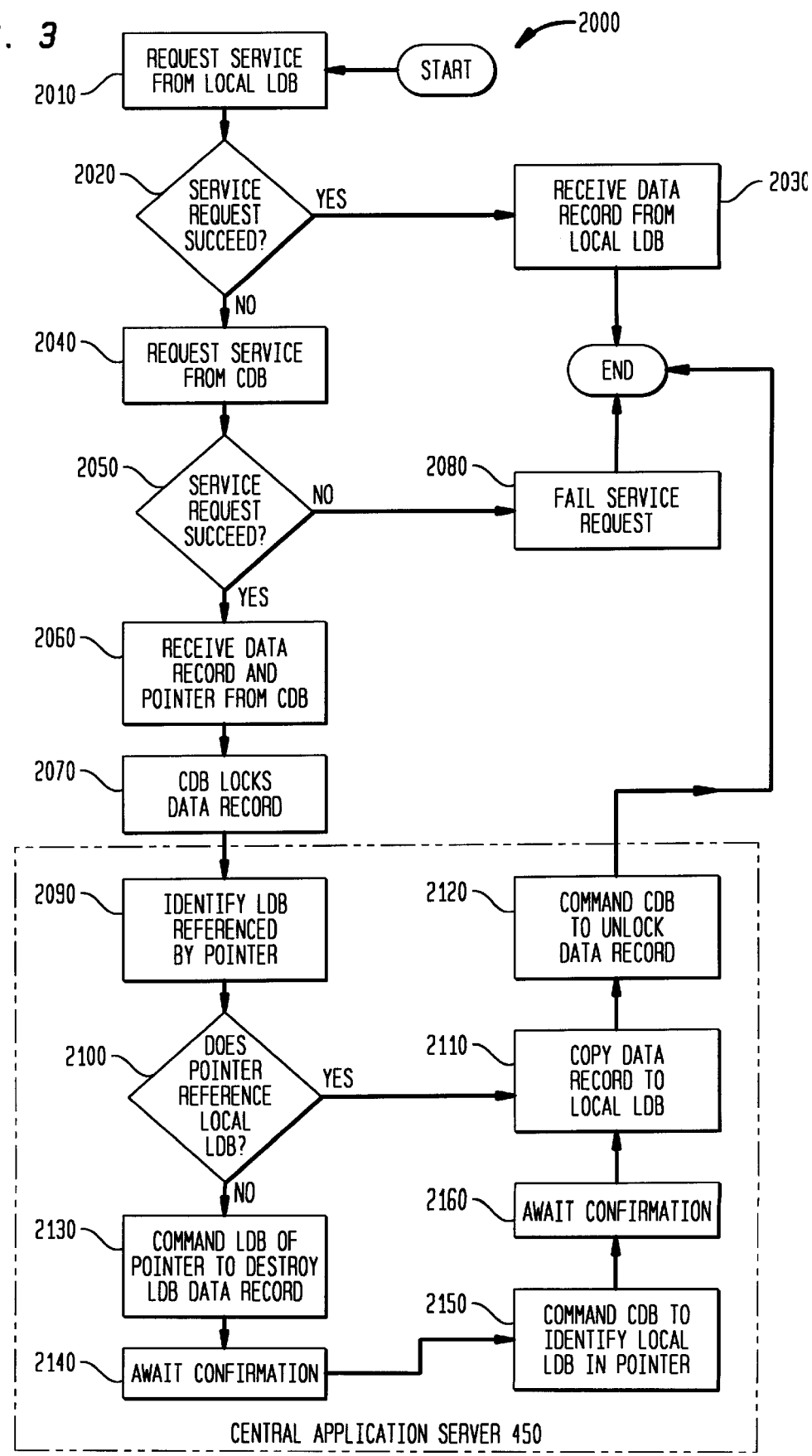

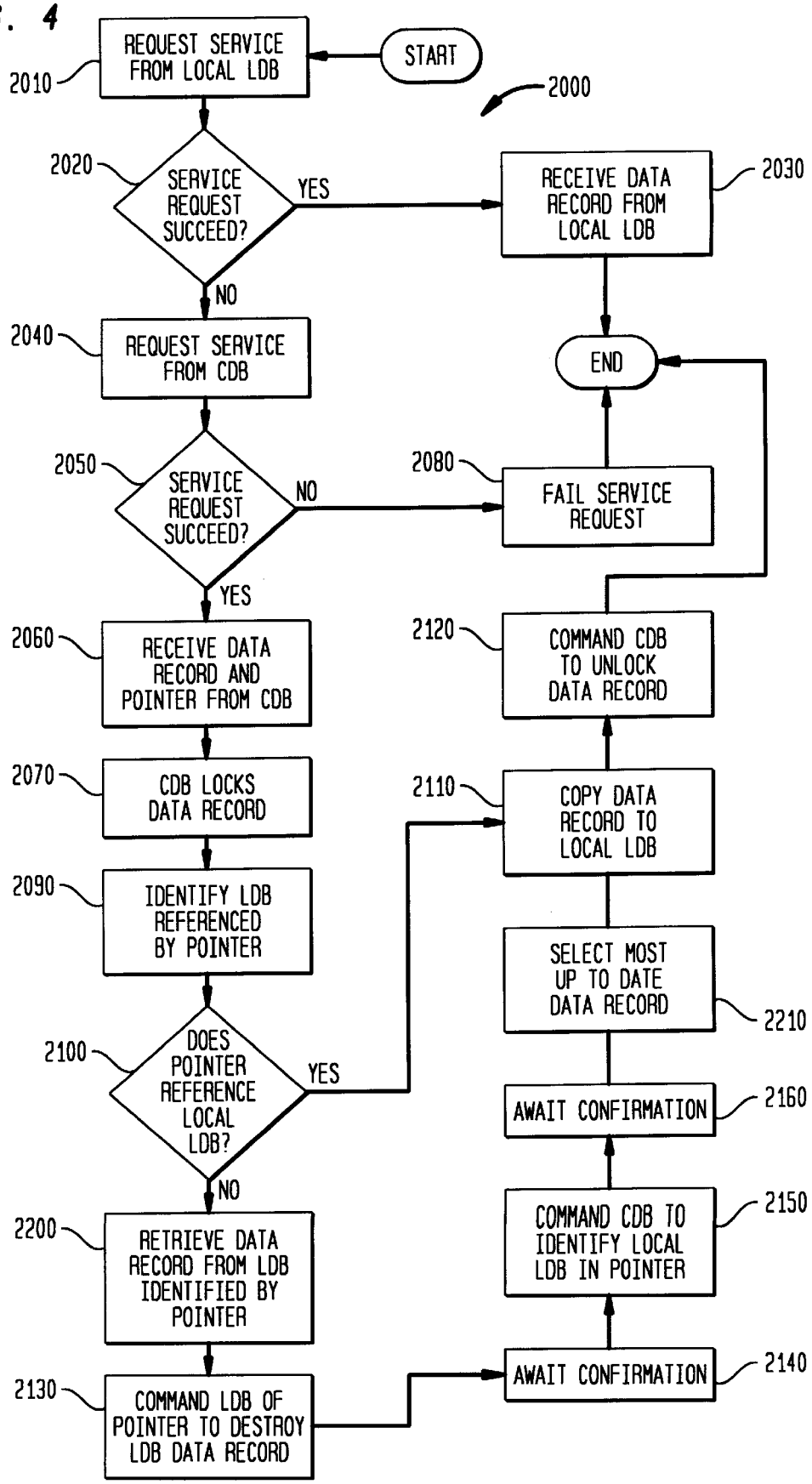

DISTRIBUTED CACHING SCHEME FOR DATABASE SYSTEMS

BACKGROUND OF THE INVENTION

The present invention relates to a caching scheme for a spatially distributed database.

Spatially distributed database systems suffer unique disadvantages. In a system where database information is kept within a central database, remote servers must establish costly communication connections with the central database each time it becomes necessary to create, retrieve or change database information. For distributed database systems, it becomes necessary to incur the cost of setting up and maintaining duplicates of the entire database at each region of service. The distributed database system incurs additional costs to maintain the databases and update the information contained therein.

Accordingly, there is a need in the art for a database system that serves spatially remote servers and that reduces costs of installation, operation and maintenance

SUMMARY OF THE INVENTION

The present invention provides a caching scheme for databases that services spatially distributed customers in which a central database maintains all information to be stored. A plurality of local databases include copies of the information stored in the central database. For each data record in the central database, there is at most one copy of the data record in the set of local databases.

The caching scheme includes a method for serving database requests in which a service request is made to a first local database located in the area from which the request originates. If the first local database fails to service the request, the central database services the request. After serving the request, a second local database that may contain the data record is identified and the data record therein is destroyed. A new copy is written to the first local database.

BRIEF DESCRIPTION OF THE DRAWINGS

FIG. 3 is a flow diagram illustrating a first embodiment of a method of operation performing a service request.

FIG. 4 is a flow diagram illustrating a second embodiment of a method of operation performing a service request.

DETAILED DESCRIPTION

The present invention provides a caching scheme for databases that service spatially distributed customers. The caching scheme possesses the following advantageous properties:

There is a fixed overhead for registration of new customers,

To access data records, there is no overhead for customers who do not move,

To access data records, customers who move then stay at their new location incur a fixed overhead for the first attempt to access the data record but no overhead for any attempt thereafter.

Figure 1:
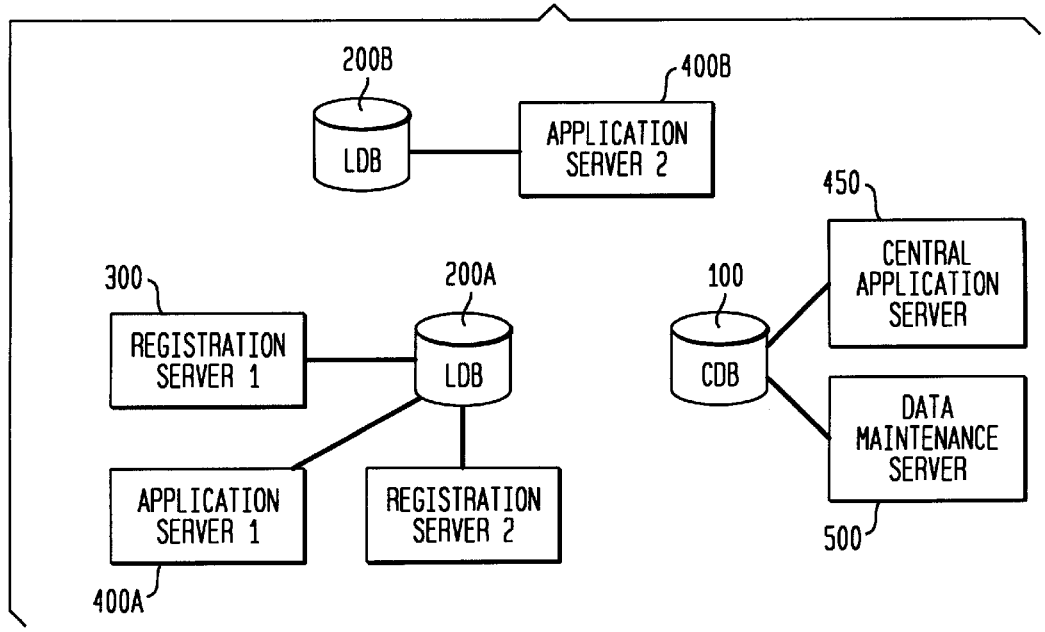
FIG. 1 is a block diagram illustrating a database system constructed in accordance with an embodiment of the present invention.

As shown in FIG. 1, the caching system includes a single central database (CDB) 100 that holds every data record of the system. A plurality of spatially distributed local databases (LDBS) 200A, 200B are provided as well. For every record in the CDB 100, there can be at most one copy of the record in the set of LDBS. Registration servers 300 register new users. Application servers 400A, 400B access the database records from the databases. Each registration server 300 and application server 400A, 400B may communicate with the CDB 100 and any LDB 200A, 200B in the system.

To maintain the advantageous features of the distributed caching scheme, customer registration, customer service and database updates are achieved through specialized methods.

A. Customer Registration

Figure 2:
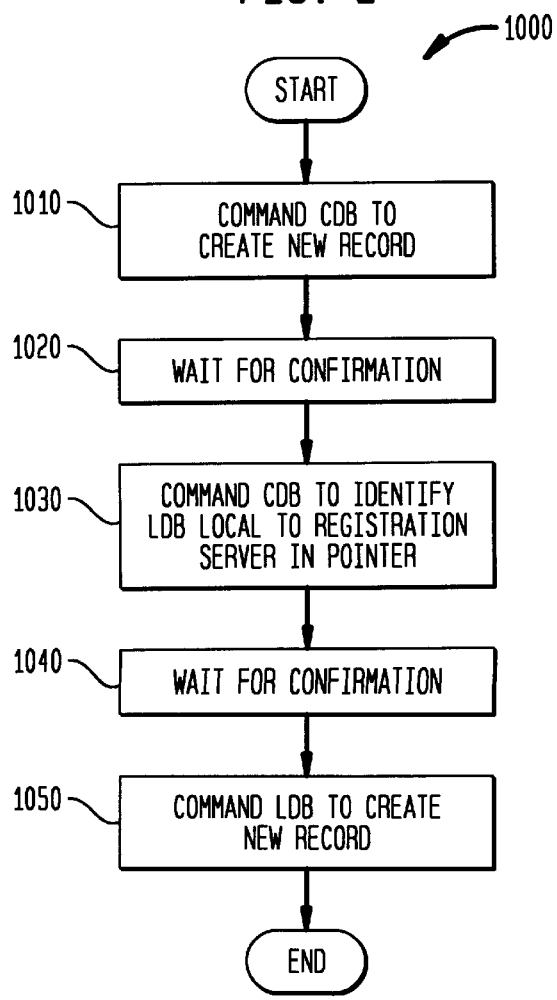
FIG. 2 is a flow diagram illustrating a registration method operating in accordance with an embodiment of the present invention.

Registration of a new customer is accomplished by a registration method. The registration server 300 may interface with the customer according to any number of conventional processes to obtain information necessary to construct a data record. The data record includes a pointer used by the present invention. Other content and structure of the data record is largely immaterial to the present discussion; it depends upon the application for which the present invention will be used. Once the registration server 300 obtains the necessary information it invokes the registration method 1000 of FIG. 2.

The registration server 300 commands the CDB 100 to create a new customer record and provides the information to be contained in the record (Step 1010). The registration server 300 then waits for the transaction to complete (Step 1020) then commands the CDB 100 to identify an LDB 200A that is local to the registration server 300 in a pointer field of the new data record (Step 1030). Again, the registration server 300 waits for the transaction to complete (Step 1040). Once the transaction completes, the new data record has been registered with the CDB 100. A prolonged failure for either database transaction to complete may cause the registration server 300 to repeat the command that was not confirmed.

The registration server 300 then creates an identical data record in the local LDB identified in step 1030 (Step 1050). The registration server 300 commands the LDB to create a data record containing the information of the customer. The data records within LDBS do not contain a pointer field as is provided in the CDB 100.

Because the present invention finds application in systems where LDBS 200 may be provided at spatially remote locations, the servers and databases of the present invention communicate using communication links (not shown) that may be subject to errors and data loss. By waiting for database transactions to complete, the system provides enhanced reliability ensuring that the messages were not lost by the communication links.

In the case of an error in writing the pointer to the CDB 100 at step 1030, the registration server does not advance to step 1050 to create the local copy of the data record in the local LDB.

B. Customer Service

Application servers such as server 400B service data requests during system operation. One method 2000 of the caching system as it services data requests is shown in FIG. 3. The application server 400B first requests the data record from the LDB 200B local to the application server 400B itself (Step 2010) If the local LDB 200B possesses the data record (Step 2020), the local LDB 200B furnishes the requested data record and the service request terminates (Step 2030). If the local LDB 200B does not possess the requested data record, the LDB 200B fails the service request.

When the local LDB 200B fails the service request, the application server 400B requests the data record from the CDB 100 (Step 2040). If the CDB 100 possesses the requested data record (Step 2050), the CDB 100 fulfills the request (Step 2060) and locks the data record from further reading and writing (Step 2070). The CDB 100 provides to application server 400B the pointer with the substantive information of the data record. If the CDB 100 does not possess the data record, the service request fails (Step 2080).

The application server 400B identifies the LDB 200 that is identified by the pointer (Step 2090). If the pointer identifies the LDB 200B local to the application server 400B (Step 2100) the application server 400B copies the data record without the pointer to the local LDB 200B in a manner similar to step 1050 of FIG. 2 (Step 2110). The application server 400B then commands the CDB 100 to unlock the locked data record (Step 2120).

If the pointer identifies another "distant" LDB as holding the data record (say, LDB 200A), the application server 400B commands the distant LDB 200A to destroy the copy (Step 2130). The application server 400B waits for the transaction to complete (Step 2140). The application server 400B then commands the CDB 100 to rewrite the pointer field of the data record to identify the local LDB 200B (Step 2150). Again, the application server 400B awaits confirmation that the command was successfully executed (Step 2160). Upon completion, the application server 400B advances to step 2110, copies the data record to the local LDB 200B and commands the CDB 100 to unlock the data record.

Using the system of FIG. 1 as an example, suppose the caching system of the present invention were applied to a database of subscribers to Internet connection services. Internet subscribers typically access the service from the spatial area in which they first registered. However, the subscribers may travel from time to time. If the subscriber remains in the area in which it first registered, the local copy of his data record remains present in the local LDB (say LDB 200A). In this case, the application server 400A will be furnished information from its local LDB 200A and the service request terminates.

However, if the subscriber moves to a new area and logs in, the new local LBD (say, LDB 200B) does not possess the subscriber's data record. Here, the application server 400B retrieves the data record from the CDB 100. The application server 400B also destroys the data record in the original LDB 200A and writes the data record in the new local LDB 200B. Successive attempts by the customer to log in from this new area will result in the local LDB 200 servicing the request.

The order of operations in the method of FIG. 3 provides an advantage in that it maintains the "at most one copy" characteristic of the caching scheme. In the event of a communication failure between an application server and the CDB 100 or any of the LDBS 200A, 200B or an equipment failure, the order of operation ensures that there are never two copies of the same data record in any pair of LDBS.

The method of FIG. 3 may be distributed over a pair of application servers, one provided local to the customer and a second, central application server 450 shown in phantom in FIG. 1. Responsibility for the method may be shared among the servers. For example, the steps 2090–2120 may be accomplished by the central application server 450.

The service request method contains several error recovery measures to maintain the "at most one copy" characteristic of the caching scheme. A local LDB may fail to overwrite a data record when so commanded at step 2130. In this instance, the LDB 200 provides one of several types of messages to the application server 400 to identify the reason the failure occurred. A first type of message indicates that the LDB 200 could not execute the command because it did not possess the identified data record. In response to this first message, the "at most one copy" characteristic of the caching scheme is confirmed, enabling the application server 400 to advance through the method of FIG. 3.

A second type of message indicates that the LDB 200 could not execute the command due to equipment malfunction. This message indicates that the data record may exist and may not be accessible to the application server 400B. In response to this second failure message, the application server 400B aborts the method of FIG. 3.

If the CDB 100 fails to execute step 2150 and rewrite the pointer in the data record to point to the LDB 200B, the application processor 400B aborts the method of FIG. 3. If it were to continue, the "at most one copy" characteristic possibly may be violated in the future. Upon a subsequent service request from a different areas the caching scheme would provide no indication that a copy was resident in the local LDB 200B of the current request.

On the failure of an LDB 200B to write a data record at step 2110, the CDB 100 will point to an LDB that does not possess a copy of the data record. Optionally, an error at step 2130 may be remedied by the application processor 400B by commanding the CDB 100 to erase the value stored in the pointer field. Because the method of FIG. 3 accommodates such errors by including a step that advances directly from step 2100 to step 2110, erasure of the pointer field may be optional. However, it finds particular use in a write back embodiment of the cache, described below.

It should be appreciated that the operation of the registration server and the application servers has been described only as it relates to the maintenance of the caching scheme of the present invention. The servers can and typically do possess additional functionality related to the application to which the invention will be integrated. Further, it should be appreciated that errors described above need not affect the servers' ability to implement the additional functionality.

For example, in the Internet example provided above, the registration server 300 may communicate with a customer to obtain information necessary to register the customer to the service. A failure of the registration server to write a copy of the data record to its local LDB 200A does not result in a failure to register the customer. Because a copy of the customer's record will have been written to the CDB 100, the customer will have been registered.

Also, in the Internet example, assume that an Internet subscriber has moved areas and logged into the Internet service from a new application server. If a distant LDB 200A fails to destroy a data record as commanded at step 2130, the application server 400B may complete the customer's request for Internet access even though the application server 400B would abort the method of FIG. 3. Because the application server 400B retrieved the customer's information from the CDB 100 in step 2060, it possesses sufficient information to service the customer's request for service.

C. Database Updates

Updates to the distributed database may be implemented by either write-through or write back techniques. In the write-through example, an application server 400B may be instructed to update data records for a customer. For example, the customer may choose to change the password relating to his account. In a write-through embodiment, the application server 400B writes the updated record first to the CDB 100. Once the CDB database transaction is complete, the application server 400B writes the updated data to the LDB 200B.

Also, in a write-through embodiment, a centralized data maintenance server 500 may update the record. For example, data records for a delinquent customer may be edited to bar the customer from accessing the service. The maintenance server 500 first retrieves the pointer from the CDB 100, then writes an amended data record to the CDB 100 over the existing record. Once the database transaction has completed, the data maintenance server 500 writes the amended data record to the LDB identified by the pointer.

In a write-back embodiment, data records are edited only at the local LDB 200B. They are not updated at the CDB 100. Relative to the write-through embodiment, the write-back technique conserves bandwidth in an update transaction. Data is not written to the CDB 100. When a customer moves location and registers with a new LDB 200A, however, registration in a write-back embodiment consumes more bandwidth relative to the write-through embodiment.

Registration in a write-back embodiment may occur according to the method of FIG. 4 in an embodiment. The method proceeds in a manner similar to FIG. 3—like steps are designated with like numerals. However, if at step 2100, the pointer from the CDB 100 designates another LDB 200B than the LDB 200A where the customer is located, the application server 400B must retrieve the data record from the other LDB 200B (Step 2200). The other LDB 200B possibly contains data that is more current than the CDB 100. If the content of the data record retrieved from the other LDB 200B is different than that held in the CDB 100, the application server 400B writes the most up to date data to the new LBD 200A (Step 2210). Thus, the registration process of FIG. 4 assures that the most current data regarding the customer is written to the new LDB 200A.

The present invention has been described above in the context of a plurality of discrete databases. However, it should be appreciated that the principles of the invention apply when the CDB 100 and the LDBS operate as single logical database and when coordination of the database is accomplished at the CDB 100.

The caching scheme described above provides service advantages to mobile customers. It is envisioned that the caching scheme will have particular application to databases that are geographically distributed. However, it finds application in distributed databases on a smaller scale, such as LANs or other network systems where remote servers may be better served by referencing a local database. The caching scheme maintains distributed copies of records from the central database in the a local database that is most likely to request them. Also, the distributed caching scheme possesses advantages over centralized databases because it reduces communication costs associated with repeated retrieval of database records from the central store. The caching system also avoids the cost of duplication and maintenance associated with general distributive database schemes.

Several embodiments of the present invention are specifically illustrated and described herein. However, it should be appreciated that modifications and variations of the present invention are covered by the above teachings and within the preview of the appended claims without departings from the spirit and intended scope of the invention.

We claim:

1. A database system servicing a plurality of distributed mobile customers, comprising:

a central database storing a plurality of data records relating to the customers, a plurality of spatially distributed local databases storing copies of the date records, there being a copy of each data record in at most one regional database at a time, wherein, for a data record located in a local database, the central database provides a pointer identifying the at most one local database storing a copy of the date record.

2. The system of claim 1, further comprising a registration server associated with one of the local databases, wherein the registration server registers a new customer by:

writing a new data record to the central database, after the data record has been written to the central database, writing a pointer to the central database identifying the associated local database, after the pointer has been written to the central database, writing the data record to the associated local database.

3. The system of claim 1, further comprising an application server associated with one of the local databases, wherein the application server services a customer by:

querying the associated local database for a data record associated with the customer, when the customer's data record is found in the associated local database, retrieving the data record.

4. The system of claim 3, wherein, when the customer's data record is not found in the associated local database, the application server services the customer by:

querying the central database for the customer's data record, when the customer's data record is found in the central database, retrieving the customer's data record and the pointer associated with the customer's data record, identifying a distant local database based upon the pointer, commanding the distant local database to destroy its copy of the customer's data record, when the destruction of the record in the distant local database is complete, writing the customer's data record to the associated local database.

5. The system of claim 1, wherein the local databases are geographically distributed.

6. A database caching method for servicing mobile customers, comprising the steps of:

creating a data record for the customer in a central database, after the data record is created, generating a pointer in the central database identifying a local database associated with the customer, and after the pointer is generated, creating a copy of the data record in the local database associated with the customer.

7. A data management method servicing mobile customers, wherein data of a customer is stored in a central database and in at most one of a plurality of spatially distributed local databases, comprising the steps of:

querying a local database proximate to the customer for the customer's data, when the customer's data is not found in the proximate local database, retrieving the customer's data and a pointer associated with the customer's data from the central database, determining whether the pointer identifies a second local database other than the proximate local database as containing the customer's data, when the pointer does not identify a second local database, writing the data in the proximate local database.

8. The method of claim 7, further comprising, when the pointer identifies a second local database other than the proximate local database, steps of:

commanding the second local database to destroy its copy of the customer's data, and after the second local database destroys its copy of the customer's data, writing the customer's data in the proximate local database.

9. The method of claim 8, wherein the retrieving step is accompanied by a step of locking the customer's data in the central database from use, and wherein the step of writing the customer's data is accompanied by a step of unlocking the customer's data in the central database.

10. The method of claim 8, further comprising a step of, before the commanding step, retrieving the customer's data from the second local database.

11. The method of claim 10, further comprising, before the writing step, steps of:

determining whether the customer's data retrieved from the second local database is different from the customer's data retrieved from the central database, and when the data is different, the writing step writes the customer's data retrieved from the second local database.

12. A data management method servicing mobile customers, wherein data of a customer is stored in a central database and in at most one of a plurality of local databases, comprising the steps of:

querying a first local database proximate to the customer for the customer's data, when the customer's data is not found in the first local database, retrieving the customer's data and a pointer associated with the customer's data from the central database, determining whether the pointer identifies a second local database as containing the customer's data, when the pointer identifies the second local database, commanding the second local database to destroy its copy of the customer's data, and after the second local database destroys its copy of the customer's data, writing the customer's data in the first local database.

13. A data management method servicing mobile customers, wherein data of a customer is stored in a central database and in at most one of a plurality of local databases, comprising the steps of:

querying a first local database proximate to the customer for the customer's data, when the customer's data is not found in the first local database, retrieving a first copy of the customer's data and a pointer associated with the customer's data from the central database, determining whether the pointer identifies a second local database as containing a second copy of the customer's data, when the pointer identifies a second local database, retrieving the second copy from the second local database, commanding the second local database to destroy its copy of the customer's data, determining whether the second copy is different from the first copy, and when the copies are different, writing the second copy to the central database and to the first local database.

14. A hierarchical database system, comprising:

a plurality of spatially distributed databases provided at a first hierarchical level, a central database system provided at a second hierarchical level, the central database level storing a plurality of data records and, for each data record, a pointer identifying one of the spatially distributed databases that most recently stored a copy of the respective data record, the database system operating according to an "at most one" control method wherein, for each data record in the central database level, there is at most one spatially distributed database that stores a copy of the data record at a time.

15. A database caching method for use at one of a plurality of regional databases, comprising:

receiving a query for a data record, determining if the requested data record is present at the one regional database, if not, querying a central database for the data record, receiving, in response to the central database query, a copy of the data record and a pointer referring to another regional database, transmitting a command to the other regional database to destroy its copy of the data record, and upon receipt of a message indicating that the other regional database has destroyed its copy of the data record, storing a copy of the data record at the one regional database.

16. A database caching method for use at one of a plurality of regional databases, comprising:

receiving a query for a data record, determining if the requested data record is present at the one regional database, if not, querying a central database identifying the data record, receiving, in response to the central database query, a pointer referring to another regional database, querying the other regional database for the data record, receiving the data record from the other regional database, and storing a copy of the data record at the one regional database, wherein the act of receiving the data record from the other regional database signifies that the other regional database has destroyed its copy of the data record.

17. A database caching method for use at a central database, comprising:

receiving a query from a first regional database for a data record, providing to the first regional database a copy of the requested data record and a pointer identifying another regional database that may store a copy of the data record, receiving from the first regional database a confirmation that a copy of the data record has been stored at the first regional database, and altering a stored copy of the pointer to identify the first regional database.

18. The database caching method of claim 17, wherein the step of receiving the confirmation signifies that the other regional database has destroyed its copy of the data record.

19. A database caching method for use at a central database, comprising:

receiving a query from a first regional database for a data record, retrieving a pointer associated with the data record, if the pointer identifies a second regional database that is different than the first regional database, signaling the second regional database to destroy its copy of the data record, upon receipt of a confirmation from the second regional database signifying that it has destroyed its copy of the data record, providing a copy of the data record to the first regional database.

20. The database caching method of claim 19, further comprising providing the data a copy of the data record to the first regional database if the pointer identifies no regional database.

21. The database caching method of claim 19, further comprising providing the data a copy of the data record to the first regional database if the pointer identifies the first regional database.

22. A database system servicing a plurality of distributed mobile customers, comprising:

a central database storing a plurality of data records relating to the customers, a plurality of spatially distributed local databases storing copies of the data records, there being a copy of each data record in at most one regional database at a time, wherein, for a data record located in a local database, the central database stores a pointer identifying a local database that most recently stored a copy of the data record.

* * * * *